(12) United States Patent
Sha

(10) Patent No.: US 12,102,236 B1
(45) Date of Patent: Oct. 1, 2024

(54) WIREDRAWING INFLATABLE MATTRESS AND MANUFACTURING METHOD THEREOF

(71) Applicant: Shanghai Quluying Outdoor Products Co., Ltd, Shanghai (CN)

(72) Inventor: Bowen Sha, Xuzhou (CN)

(73) Assignee: Shanghai Quluying Outdoor Products Co., Ltd, Shanghai (CN)

(*) Notice: Subject to any disclaimer, the term of this patent is extended or adjusted under 35 U.S.C. 154(b) by 0 days.

(21) Appl. No.: 18/394,768

(22) Filed: Dec. 22, 2023

(30) Foreign Application Priority Data

Nov. 2, 2023 (CN) .......................... 202311452076.3
Nov. 2, 2023 (CN) .......................... 202322966762.4

(51) Int. Cl.
*A47C 27/08* (2006.01)
*B29C 65/04* (2006.01)

(52) U.S. Cl.
CPC .......... *A47C 27/082* (2013.01); *A47C 27/087* (2013.01); *B29C 65/04* (2013.01)

(58) Field of Classification Search
CPC .............................. A47C 27/087; B29C 65/04
See application file for complete search history.

(56) References Cited

U.S. PATENT DOCUMENTS 1,610,898 A * 12/1926 Steiner ................ A47C 27/081
5/712

FOREIGN PATENT DOCUMENTS

| CN | 208877081 U | 5/2019 |
| CN | 209202537 U | 8/2019 |
| CN | 217337982 U | 9/2022 |

* cited by examiner

*Primary Examiner* — Daniel McNally
(74) *Attorney, Agent, or Firm* — Nitin Kaushik

(57) ABSTRACT

The present application provides a wiredrawing inflatable mattress and a manufacturing method thereof. The method includes: first fixedly connecting a cut first face layer and second face layer to a reinforcing strap and trimming and forming the same, then welding the first face layer and the second face layer to two sides of a wiredrawing body respectively and trimming the same, then respectively clamping two end portions of a side wall installed with an air nozzle and an air pump between the first face layer and the reinforcing strap and between the second face layer and the reinforcing strip, performing welding and connecting successively from top to bottom, and finally, trimming the remaining edges and checking the air tightness so as to ensure the stability in use.

8 Claims, 8 Drawing Sheets

---

S1 Welding and connecting outer edges of the first face layer (21) and the second face layer (22) respectively to the reinforcing strap (4b), and trimming to control a corresponding size of the reinforcing strap (4b)

↓

S2 Welding and connecting the first face layer (21) and the second face layer (22) to the wiredrawing body (1) to form a mattress body, and cutting and controlling the size of the first face layer (21) and the second face layer (22)

↓

S3 Welding and connecting one side of a cut first face layer (21) to an outer side of an upper end of the side wall (3) via the reinforcing strap (4b), and directly welding and connecting the other side to an inner side of the upper end of the side wall (3)

↓

S4 Welding and connecting an outer side of a lower end of the side wall (3) to the reinforcing strap (4b) located on the second face layer (22), and directly welding and connecting an inner side of the lower end of the side wall (3) to the second face layer (22)

Prior Art

| S1 Welding and connecting outer edges of the first face layer (21) and the second face layer (22) respectively to the reinforcing strap (4b), and trimming to control a corresponding size of the reinforcing strap (4b) |
|---|

| S2 Welding and connecting the first face layer (21) and the second face layer (22) to the wiredrawing body (1) to form a mattress body, and cutting and controlling the size of the first face layer (21) and the second face layer (22) |
|---|

| S3 Welding and connecting one side of a cut first face layer (21) to an outer side of an upper end of the side wall (3) via the reinforcing strap (4b), and directly welding and connecting the other side to an inner side of the upper end of the side wall (3) |
|---|

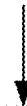

| S4 Welding and connecting an outer side of a lower end of the side wall (3) to the reinforcing strap (4b) located on the second face layer (22), and directly welding and connecting an inner side of the lower end of the side wall (3) to the second face layer (22) |
|---|

FIG. 4

WIREDRAWING INFLATABLE MATTRESS AND MANUFACTURING METHOD THEREOF

CROSS-REFERENCE TO RELATED APPLICATIONS

The application claims priority to Chinese patent application No. 2023229667624 and No. 2023114520763, filed on Nov. 2, 2023, the entire contents of which are incorporated herein by reference.

TECHNICAL FIELD

Embodiments of the present application relate to the technical field of mattresses, and more particularly to a wiredrawing inflatable mattress and a manufacturing method thereof.

BACKGROUND

With the gradual improvement of people's quality of life, camping has gradually become a fashionable leisure way. As stable and light mattresses convenient for storage, inflatable mattresses are widely used in outdoor camping and other occasions with high storage requirements. The inflatable mattress not only provides sufficient support, but also allows it to be stored in a bag when not in use, thereby improving space efficiency. Because of the high space efficiency, the inflatable mattress can not only be used in outdoor camping occasions. Conventional inflatable mattresses on the market are generally composed of an upper sheet, a lower sheet, and like components. A chamber is formed by welding and connecting the sheets, an inflating hole is provided on the side wall of a side edge, and the air can be inflated into the interior such that it has sufficient support.

However, in the inflatable mattress as shown in FIG. 1, since there is a certain limitation of conventional processing, the periphery of the mattress protrudes outwardly, and the cross-section is oval. To improve its aesthetics, a chamber 6 connected to the inner cavity of the mattress is usually left at the connection between the side wall 3 and the face layer 2 after the processing, so that the inflatable mattress can complete normal storage. However, since the chamber 6 is left at the connection, the inflatable mattress has low support for its surrounding sides when in use. When the user approaches the surrounding sides of the mattress during use, a fall occurs due to the relatively low support. This affects the user experience.

SUMMARY

The object of the present invention is to address the aforementioned issues in prior art. A wiredrawing inflatable mattress and a manufacturing method thereof are proposed. The technical problem to be solved in the present application is how to improve the user experience.

In order to solve the above-mentioned problems, in the first aspect, embodiments of the present application provide a wiredrawing inflatable mattress, comprising a wiredrawing body, and two face layers and a side wall surrounding the wiredrawing body, two ends of the two face layers being welded and connected to the side wall, wherein a connecting strap overlapping and connecting with the side wall is welded and connected to outer edges of the two face layers, the connecting strap comprises a fitting strap and a reinforcing band, the side wall overlaps with a part of the fitting strap, the reinforcing strap covers an overlapping position, and an end of the side wall can be clamped and connected between the fitting strap and the reinforcing band.

In the second aspect, embodiments of the present application also provide a manufacturing method for a wiredrawing inflatable mattress, the mattress comprising a wiredrawing body formed by cutting, a first face layer, a second face layer, and a side wall, the side wall being provided thereon with an air pump and an air nozzle, and an end of the side wall being connected to the first face layer or the second face layer via a reinforcing strap and an outer side face of the first face layer or the second face layer, wherein the manufacturing method comprises steps below:

S1, welding and connecting outer edges of the first face layer and the second face layer respectively to the reinforcing strip, and trimming to control a corresponding size of the reinforcing strip;

S2, welding and connecting the first face layer and the second face layer to the wiredrawing body to form a mattress body, and cutting and controlling a size of the first face layer and the second face layer;

S3, welding and connecting one side of a cut first face layer to an outer side of an upper end of the side wall via the reinforcing strip, and directly welding and connecting the other side to an inner side of the upper end of the side wall; and S4, welding and connecting an outer side of a lower end of the side wall to the reinforcing strap located on the second face layer, and directly welding and connecting an inner side of the lower end of the side wall to the second face layer.

BRIEF DESCRIPTION OF DRAWINGS

In order to illustrate the technical solutions in the embodiments of the present application or the prior art more clearly, the following will briefly introduce the drawings that need to be used in the description of the embodiments or the related art. Obviously, the drawings in the following description are merely embodiments of the present application. For those of ordinary skills in the art, other drawings can be obtained according to the accompanying drawings.

FIG. 4 is a flowchart of a manufacturing method for a wiredrawing inflatable mattress provided in an embodiment of the present invention;

Figure 1:
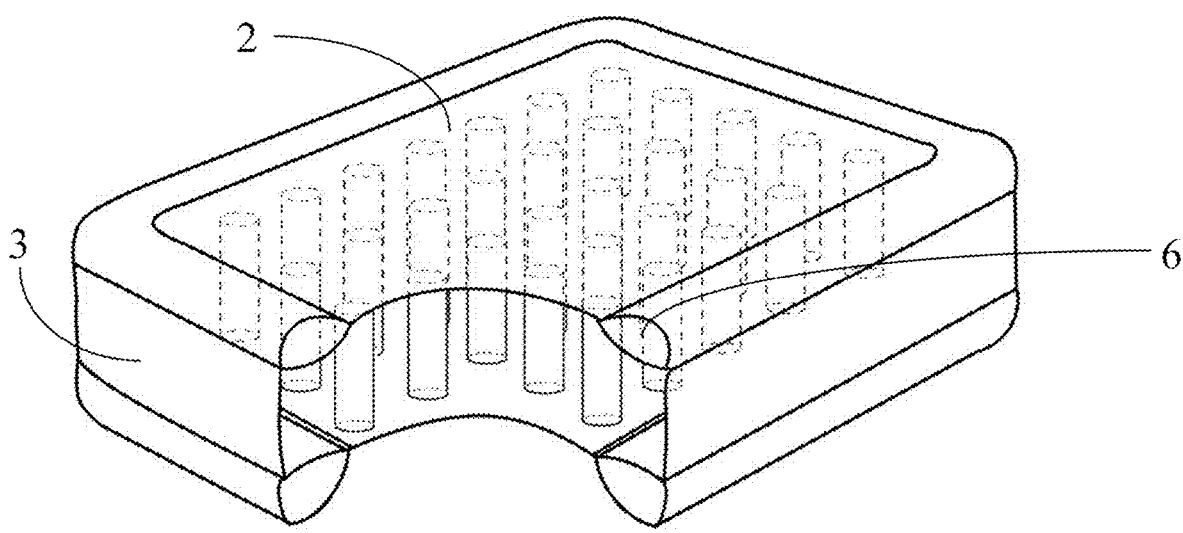
FIG. 1 is a schematic semi-sectional perspective view of a mattress in the prior art.

In the drawings: 1, a wiredrawing body; 2, a face layer; 21, a first face layer; 22, a second face layer; 3, a side wall; 3a, an air hole; 3a1, an air nozzle; 3a2, a pull ring; 4, a connecting strap; 4a, a fitting strap; 4b, a reinforcing strap, 4c, an internal indentation; 4d, an external indentation; 5, an air pump; 5b, an air pump hole; and 6, a chamber.

DETAILED DESCRIPTION OF THE EMBODIMENTS

In order to make the purposes, technical solutions, and advantages of the present disclosure clearer, the following will provide a further detailed description of the present disclosure in conjunction with the accompanying drawings. Obviously, the described embodiments are merely a part of the embodiments of the present disclosure, rather than all the embodiments. Based on the embodiments of the present disclosure, all other embodiments obtained by one of ordinary skills in the art without involving any inventive effort are within the scope of the present disclosure.

Figure 2:
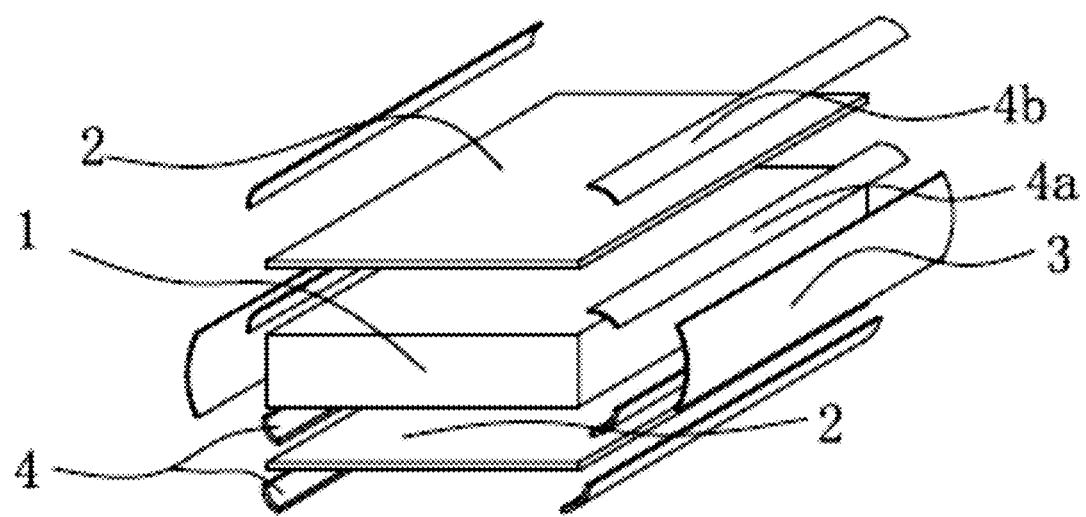
FIG. 2 is a schematic view of the explosive structure of a wiredrawing inflatable mattress provided in an embodiment of the present invention.

An embodiment of the present application provides a wiredrawing inflatable mattress. As shown in FIG. 2, a wiredrawing body 1 is covered with a face layer 2 at the top and bottom, and a connecting strap 4 comprising a fitting strap 4a and a reinforcing strap 4b is arranged at the outer edge of the face layer 2. The fitting strap 4a is located below the face layer 2, the reinforcing strap 4b is located above the fitting strap 4a, and a side wall 3 is further provided on the surrounding side of the wiredrawing body 1. Two ends of the side wall 3 can overlap with the fitting strap 4a and be connected with the same by welding, and the reinforcing strap 4b is located at the position where the fitting strap 4a overlaps with the side wall 3. Alternatively, the fitting strap 4a is located above the face layer 2. Alternatively, the fitting strap 4a is part of the face layer 2.

Figure 3:
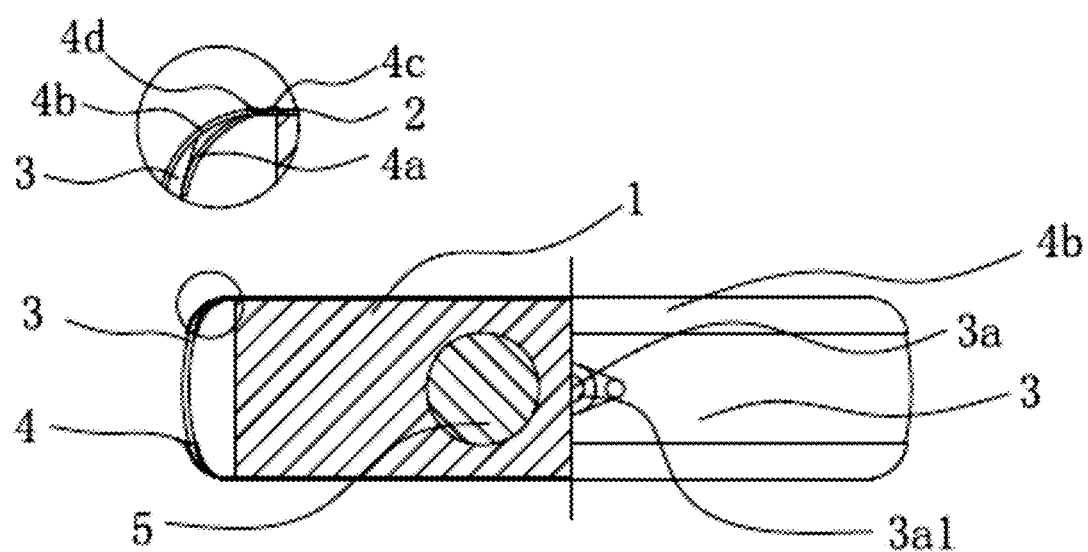
FIG. 3 is a schematic view of the cross-sectional structure of a wiredrawing inflatable mattress provided in an embodiment of the present invention.

As shown in FIG. 3, an air nozzle 3a1 and an air hole 3a are provided on the side wall 3 of the wiredrawing inflatable mattress, a detachable air pump 5 is provided inside the wiredrawing inflatable mattress, and two ends of the side wall 3 and the face layers 2 on the top and bottom of the wiredrawing body 1 are connected via a fitting strap 4a and a reinforcing strap 4b. One end of the fitting strap 4a is welded and connected to the face layer 2 and forms an internal indentation 4c, and the other end overlaps with one end of the side wall 3 and is adhesively connected thereto, and the reinforcing strap 4b covers the above-mentioned position where the side wall 3 overlaps with the fitting strap 4a. An end portion of the side wall 3 is clamped between the fitting strap 4a and the reinforcing strap 4b, in which case welding and connecting are performed by a high-frequency welding device. One end of the reinforcing strap 4b is welded and connected to the fitting strap 4a and forms an external indentation 4d. The reinforcing strap 4b and the fitting strap 4a are formed by welding PVC material with PVC fitting cloth.

In summary, the main working principles of the present application are as follows. The air pump 5 in the wiredrawing inflatable mattress cooperates with the air nozzle 3a1 on the side wall 3, and air is input into the wiredrawing inflatable mattress, so as to improve the support of the air cushion by increasing the internal air pressure. In the process of inflation, the spacing between the two face layers 2 is continuously increased. In addition, since the two face layers 2 are connected via the connecting strap 4 and the side wall 3, in which case the inner wing wall at one end of the side wall 3 is connected to the fitting strap 4a and one end of the fitting strap 4a is welded and connected to the face layer 2 via a high-frequency welding device and forms an internal indentation 4c, the two ends of the side wall 3 are stretched to two sides under the influence of the face layer 2 such that the inner wall of the side wall 3 is gradually close to the wing wall of the wiredrawing body 1. In order to enhance the connection strength between the side wall 3 and the fitting strap 4a, the overlapping part of the side wall 3 and the fitting strap 4a is covered with a reinforcing strap 4b, and the reinforcing strap 4b is welded and connected to the fitting strap 4a and an external indentation 4d is formed. The side wall 3 is connected to the face layer 2 by means of being clamped by the fitting strap 4a and the reinforcing strap 4b, so that the side wall 3 stretches towards two ends during the inflation and gradually approaches the wiredrawing body 1 while ensuring that the side wall 3 is tightly connected without leakage. At that, the middle position of the side wall 3 is prevented from protruding outwards and the aesthetic property is improved. Moreover, compared with the case where the protrusions around the periphery are oval in FIG. 1, and chambers 6 are provided above and below the protrusions, the technology of the present embodiment is simpler. Under the condition of the same area, the support coverage area is larger, so that the dumping due to insufficient side support can be avoided and the user experience can be improved. In the storage process after use, due to the simple structure, the side walls 3 only protrude outward and are folded, so that the thickness of the edges is lower during the folding process, so as to facilitate the user in folding and storing.

In addition, the face layer 2 is welded and connected to the fitting strap 4a and an internal indentation 4c is formed, so as to ensure the strength of the welded connection and avoid air leakage or falling off due to solder skip caused by foreign matter on the surface. Besides, the reinforcing strap 4b is welded and connected to the fitting strap 4a via a high-frequency welding device to form an external indentation 4d. The fitting strap 4a and the reinforcing strap 4b are successively welded and connected to the face layer 2, thereby avoiding insufficient welding caused by the overlapping welding connection between the reinforcing strap 4b and the fitting strap 4a so as to improve the stability of welding.

Compared with the prior art, the wiredrawing inflatable mattress of the present application has the following advantages.

1. This solution mainly includes a wiredrawing body and a face layer and a side wall wrapped outside the wiredrawing body; and the face layer and the side wall are connected via a connecting strap composed of a fitting strap and a reinforcing strap, so that after the inflation is completed, two ends of the side wall are subjected to an outward stretching force, thereby avoiding outward protruding around the mattress. While enhancing aesthetic properties, it makes the support of the inflatable mattress more comprehensive, thereby improving the user experience.

2. In this solution, the air pump is placed inside the inflatable mattress, and an air nozzle with an air hole installed is provided on the side wall, so as to improve the portability of the use of the inflatable mattress.

The present application also provides a manufacturing method for a wiredrawing inflatable mattress that may be used to manufacture the wiredrawing inflatable mattress provided by the above embodiments.

Figure 5A:
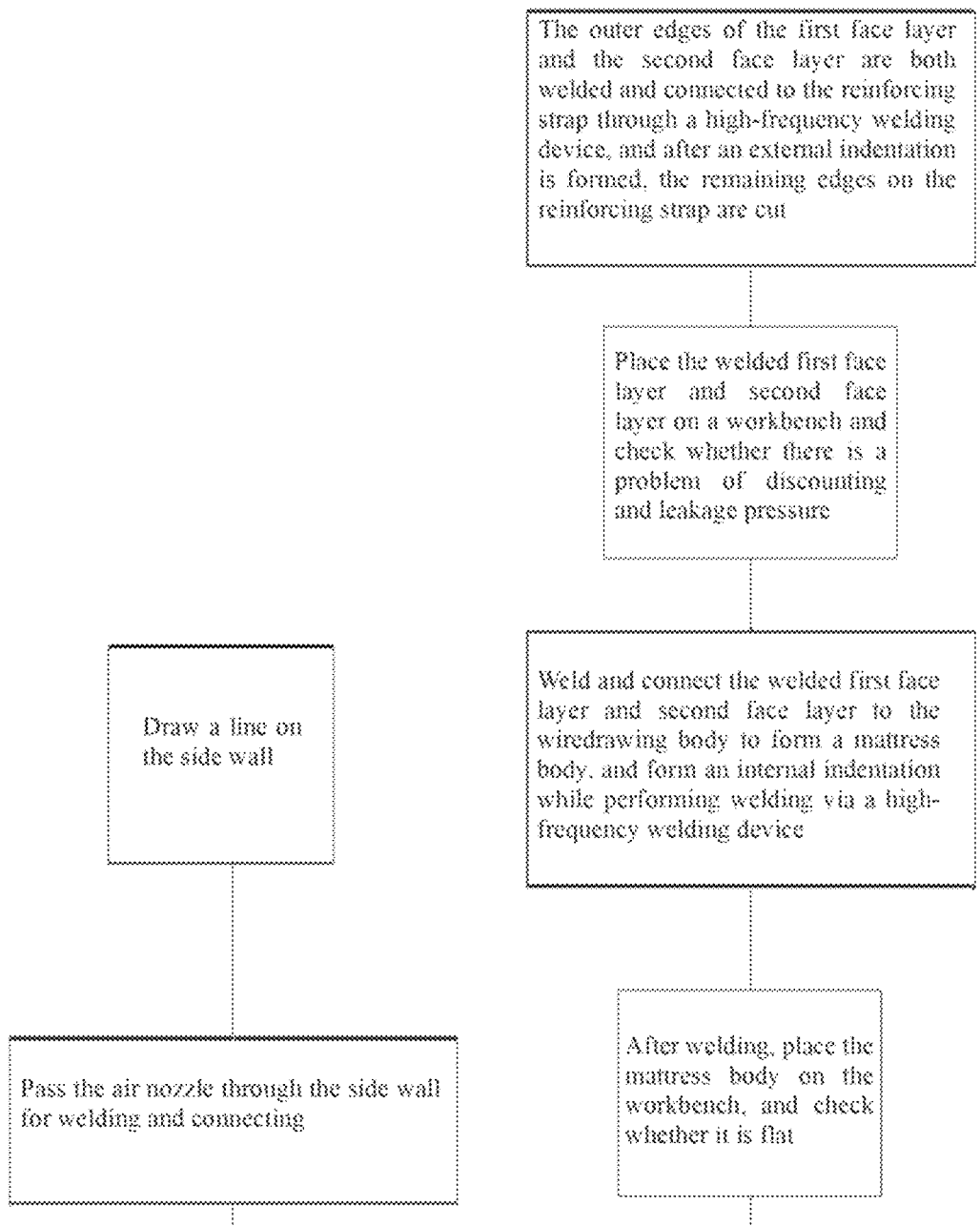
FIGS. 5A, 5B and 5C is a flowchart of a manufacturing method for a wiredrawing inflatable mattress provided in an embodiment of the present invention.
Figure 5B:
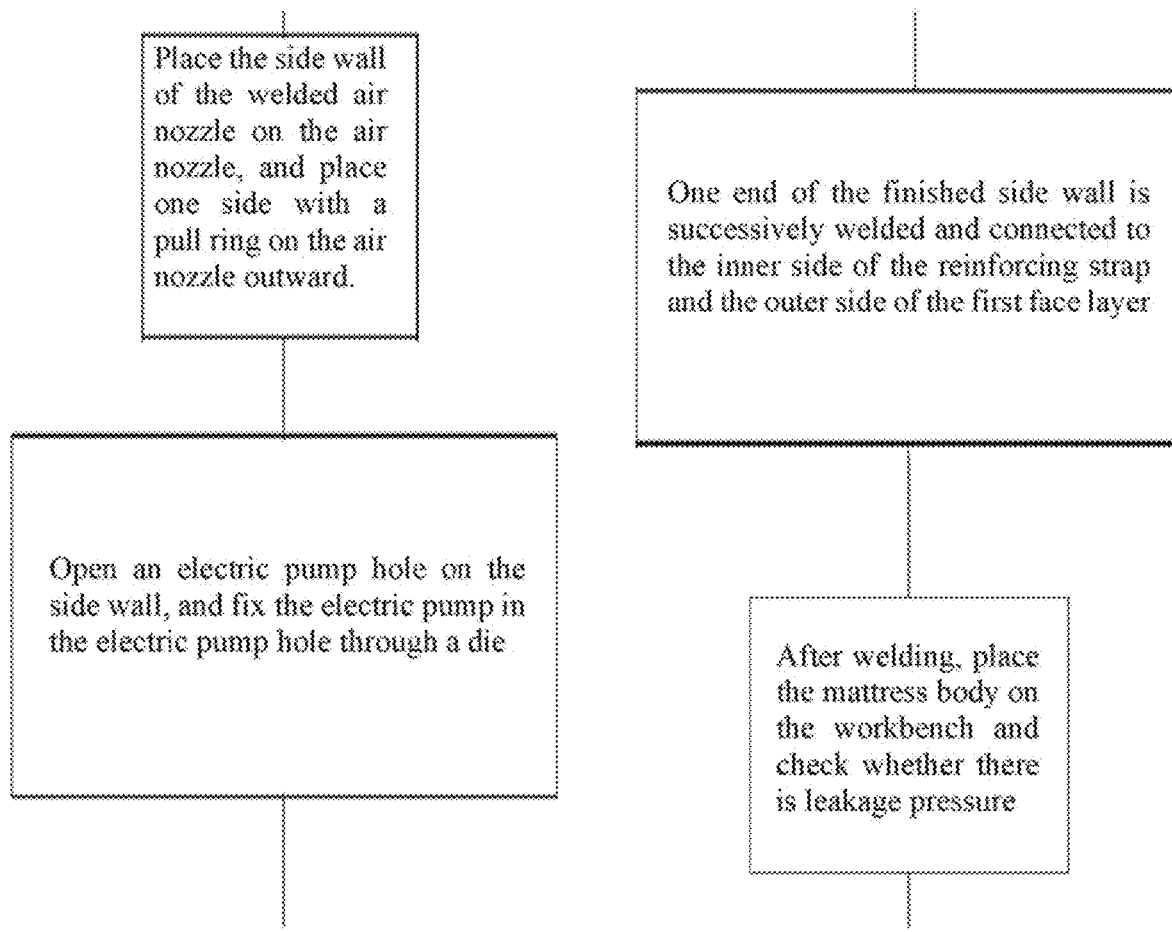
Figure 5C:
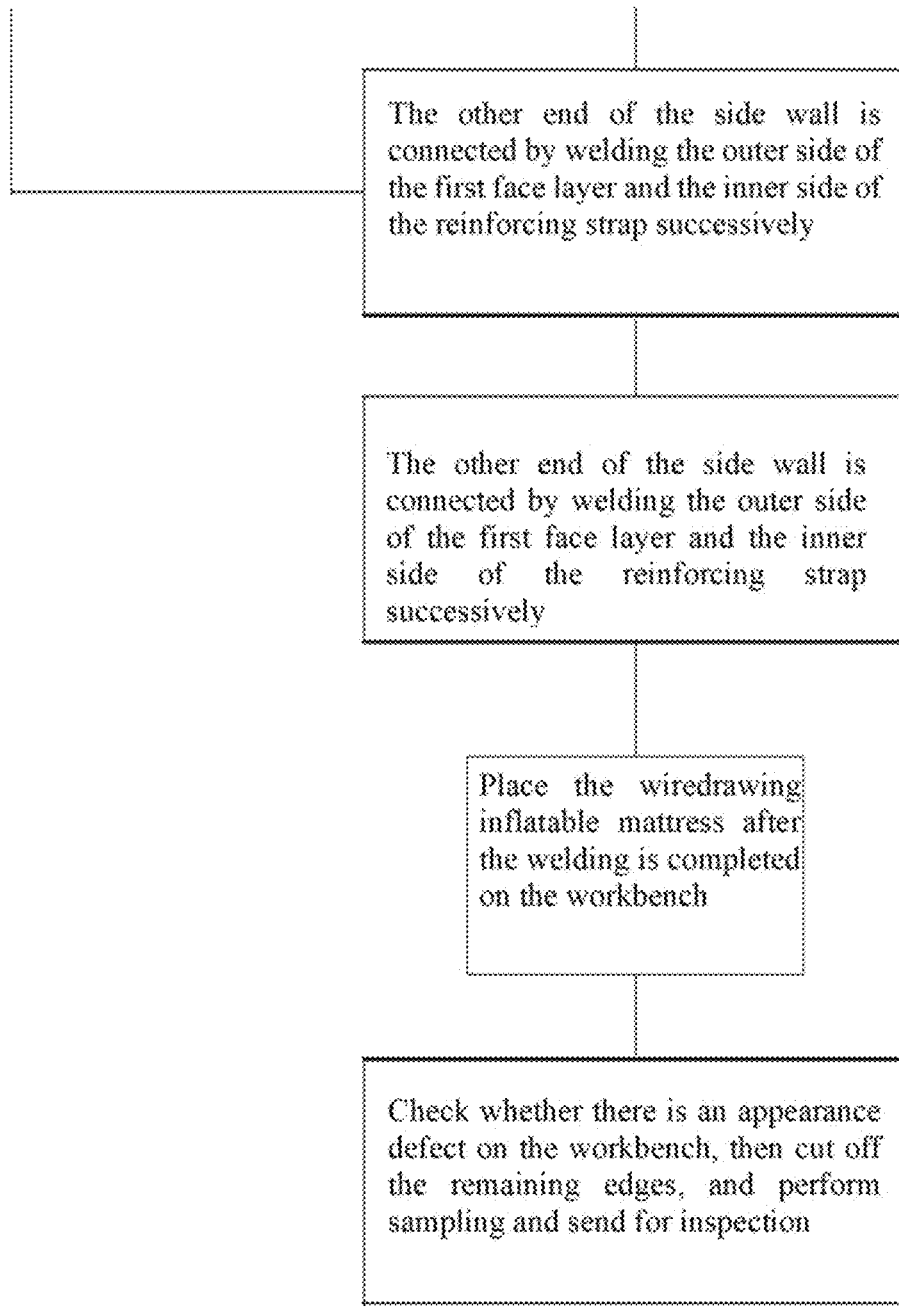
Figure 6:
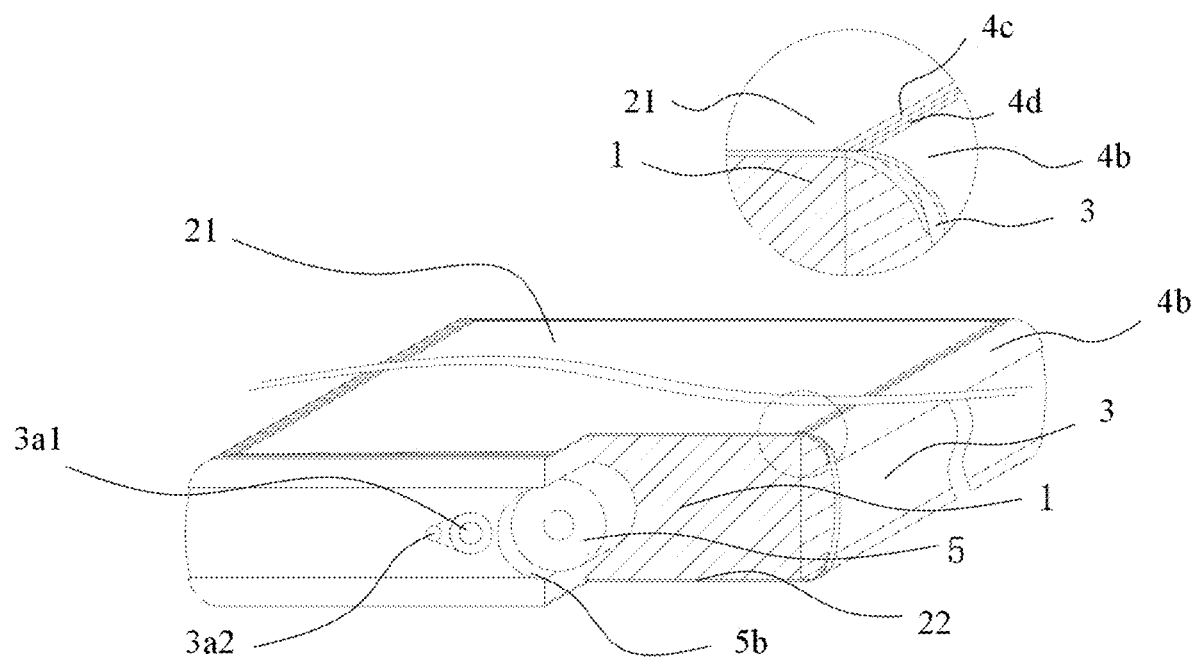
FIG. 6 is a schematic view of a three-dimensional sectional structure of a wiredrawing inflatable mattress provided in an embodiment of the present invention.

With reference to FIGS. 4-6, the wiredrawing inflatable mattress comprises a first face layer 21, a second face layer 22, and a wiredrawing body 1 connected to the support faces of the first face layer 21 and the second face layer 22, wherein the first face layer 21 and the second face layer 22 are also connected via a side wall 3 located at the side portion of the wiredrawing body 1. Two ends of the side wall 3 are both provided with a reinforcing strap 4b, one end of the reinforcing strap 4b is welded and connected to the face layer 2 via a high-frequency device and forms an external indentation 4d, the other end is respectively welded and connected to the outer sides of two ends of the side wall 3, and an air nozzle 3a1 and an air pump 5 are installed in the middle of the side wall 3. The first face layer 21, the second face layer 22, and the wiredrawing body 1 are welded to form an internal indentation 8.

As shown in FIG. 6, after the wiredrawing mattress finishes the pre-treatment of the wiredrawing body 1, the first face layer 21, the second face layer 22, and the reinforcing strap 4b, such as line drawing and cutting, the processing steps performed are mainly:

S1, welding and connecting the outer edges of the first face layer 21 and the second face layer 22 respectively to the reinforcing strap 4b, trimming and controlling the corresponding size of the reinforcing strap 4b, then placing the same on a workbench, checking whether there is a leakage pressure or a folding phenomenon at a certain place, placing the unqualified product in a non-conforming product area, and then further processing the qualified product;

S2, taking the first face layer 21 and the second face layer 22 which are welded down from the workbench, and after the first face layer 21 and the second face layer 22 are laid flat, welding and connecting the first face layer 21 and the second face layer 22 to the wiredrawing body 1 via a high-frequency welding device; and forming an internal indentation 8 on both the first face layer 21 and the second face layer 22 to form a mattress main body, then placing the same on the workbench, and after the sizes of the first face layer 21 and the second face layer 22 are cut and controlled, preparing for the next step;

S3, taking the mattress body down from the workbench, and enabling one side of the cut first face layer 21 to be welded and connected to the outer side of the upper end of the side wall 3 via the reinforcing strap 4b, and the other side to be directly welded and connected to the inner side of the upper end of the side wall 3;

S4, welding and connecting the outer side of the lower end of the side wall 3 to the reinforcing strap 4b located on the second face layer 22, directly welding and connecting the inner side of the lower end of the side wall 3 to the second face layer 22, and after the welding is completed, placing the finished product on the workbench; and S5, placing the finished product on the workbench and checking whether there is any appearance defect, placing the finished product with appearance defect on the non-conforming product area, after the remaining edges of qualified products are cut off, performing sampling and sending them for inspection, and then performing packaging after the inspection.

Before the side wall 3 is welded and connected to the mattress main body, a line is drawn on the side wall 3 which is cut in advance and a hole for installing the air nozzle 3a1 and a hole for installing the air pump 5 are opened according to the drawn line, and a size line of an overlapping portion when the reinforcing strap 4b is welded and connected to the first face layer 21 and the second face layer 22 is obtained, so as to facilitate the welding and connection of the first face layer 21, the second face layer 22, and the reinforcing strap 4b in the later stage. After the hole opening, the air nozzle 3a1 is pressed into the side wall 3 through the device, and one side of the air nozzle 3a1 with a pull ring 3a2 is located on the outer side of the side wall 3; it is then placed on the workbench, and one side with the pull ring 3a2 is arranged outward one by one; and finally, the air pump 5 is pressed into the air pump hole 5b of the side wall 3 through a die.

With regard to the mattress main body and the side wall 3 of the wiredrawing mattress, according to the manner of firstly welding to the inner side of the reinforcing strap 4b on the first face layer 21, then welding to the outer side of the first face layer 21, then welding to the outer side of the second face layer 22, and finally welding to the inner side of the reinforcing strap 4b on the second face layer 22, the side wall 3 and the mattress main body are welded and connected from top to bottom by means of a high-frequency welding device along the height direction of the wiredrawing mattress, so as to facilitate the processing and improve the production efficiency. In addition, the reinforcing strap 4b is welded and then welding and connecting to the wiredrawing body 1 is performed. After the reinforcing strap 4b is welded, the first face layer 21 and the second face layer 22 can be better located when a fixed connection to the wiredrawing body 1 is performed, so as to reduce the risks of producing defective products due to dislocation, and improve the production efficiency while ensuring that the wiredrawing mattress has sufficient support.

Compared with the prior art, the manufacturing method for a wiredrawing inflatable mattress provided by the present application has the following advantages.

1. In this solution, welding and connecting to the side wall is directly performed via the face layer and the reinforcing strip, so that the side wall is gradually stretched during the process of inflating the inflatable mattress. Therefore, the side wall is adhered to the side portion of the wiredrawing body as much as possible. At that, the support surface is increased, so as to ensure that the mattress is uniformly stressed, and at the same time, two ends of the side wall are welded from top to bottom to the wiredrawing body, and cutting is performed after welding to avoid the fabric being too long to affect the use and aesthetics. The side wall is directly connected to the face layer, and the connection strength is improved via the reinforcing strip, so as to simplify the structure; and at the same time, the processed face layer is transferred via the workbench, and the side wall is welded to the mattress main body from top to bottom. Besides, while improving processing efficiency, the inflatable mattress is adjusted and trimmed through the workbench, thereby improving the yield of the inflatable mattresses.

2. In this solution, the first face layer and the second face layer are welded and connected to the reinforcing strap and the wiredrawing body respectively, and an internal indentation and an external indentation are formed at the connection, so as to ensure the connection strength, and at the same time, judge whether there is a possibility of leakage pressure and mis-welding by the circumstance whether there is a breakpoint and a relative position on the indentation, thereby improving the product yield.

The specific embodiments described herein are merely illustrative of the spirit of the present invention. Technicians in the technical field to which the present invention belongs may make various modifications or supplements to the specific embodiments described, or use similar modes to replace them, and that will not deviate from the spirit of the present invention or go beyond the scope defined in the attached claims.

What is claimed is:

1. A manufacturing method for a wiredrawing inflatable mattress, the mattress comprising a wiredrawing body (1), a first face layer (21), a second face layer (22), and a side wall (3) which are formed by cutting, the side wall (3) being provided thereon with an air pump (5) and an air nozzle (3a1), and an end of the side wall (3) being connected to the first face layer (21) or the second face layer (22) via a reinforcing strap (4b) and an outer side face of the first face layer (21) or the second face layer (22), wherein the manufacturing method comprises steps below:

- S1, welding and connecting outer edges of the first face layer (21) and the second face layer (22) respectively to the reinforcing strap (4b), and performing trimming to control a corresponding size of the reinforcing strap (4b);
- S2, welding and connecting the first face layer (21) and the second face layer (22) to the wiredrawing body (1) to form a mattress body, and cutting and controlling a size of the first face layer (21) and the second face layer (22);
- S3, welding and connecting one side of a cut first face layer (21) to an outer side of an upper end of the side wall (3) via the reinforcing strap (4b), and directly welding and connecting another side to an inner side of the upper end of the side wall (3); and
- S4, welding and connecting an outer side of a lower end of the side wall (3) to the reinforcing strap (4b) located on the second face layer (22), and directly welding and connecting an inner side of the lower end of the side wall (3) to the second face layer (22).

2. The manufacturing method for a wiredrawing inflatable mattress according to claim 1, further comprising, before step S3: drawing a line on the side wall (3), fixedly connecting an air nozzle (3a1) to the side wall (3), then opening an air pump hole (5b) in the side wall (3), and pressing the air pump (5) in through a die.

3. The manufacturing method for a wiredrawing inflatable mattress according to claim 2, wherein the side wall (3), after cutting, is marked and subjected to line drawing at a position where a hole needs to be opened, and the air nozzle (3a1) is welded through the side wall (3).

4. The manufacturing method for a wiredrawing inflatable mattress according to claim 3, wherein the side wall (3) is taken down and the air pump hole (5b) is formed in the side wall (3), and then the air pump (5) is fixed to the side wall (3) through the air pump hole (5b) by using a die.

5. The manufacturing method for a wiredrawing inflatable mattress according to claim 1, further comprising, after step S1: checking whether there is leakage pressure or folding at a certain position phenomenon, and if so, placing in a non-conforming area.

6. The manufacturing method for a wiredrawing inflatable mattress according to claim 1, wherein the reinforcing strap (4b) is welded to the first face layer (21) or the second face layer (22), respectively, by means of a high-frequency welding device, and an external indentation (4d) is formed on the reinforcing strap (4b).

7. The manufacturing method for a wiredrawing inflatable mattress according to claim 1, wherein step S2 comprises: after the first face layer (21) and the second face layer (22) are both laid flat, welding and connecting the wiredrawing body (1) to the first face layer (21) and the second face layer (22) via a high-frequency welding device, and forming an internal indentation (4c) on both the first face layer (21) and the second face layer (22).

8. The manufacturing method for a wiredrawing inflatable mattress according to claim 1, further comprising, after step S4: checking whether a finished product has appearance defects, and if so, placing in a non-conforming product area.

* * * * *